United States Patent
Malik et al.

(10) Patent No.: US 8,145,720 B2
(45) Date of Patent: Mar. 27, 2012

(54) VALIDATING USER INFORMATION PRIOR TO SWITCHING INTERNET SERVICE PROVIDERS

(75) Inventors: Dale W. Malik, Dunwoody, GA (US); Michael Jackson, Lithonia, GA (US); Jeffrey Allen Lord, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 166 days.

(21) Appl. No.: 12/254,184

(22) Filed: Oct. 20, 2008

(65) Prior Publication Data

US 2009/0043903 A1 Feb. 12, 2009

Related U.S. Application Data

(63) Continuation of application No. 10/462,244, filed on Jun. 16, 2003, now abandoned.

(60) Provisional application No. 60/478,439, filed on Jun. 12, 2003.

(51) Int. Cl.
*G06F 15/16* (2006.01)
(52) U.S. Cl. ............ 709/206; 709/203; 709/217
(58) Field of Classification Search ............ 709/206, 709/207, 203, 217, 219, 227, 228
See application file for complete search history.

(56) References Cited

U.S. PATENT DOCUMENTS

| | | | |
|---|---|---|---|
| 5,448,044 A | 9/1995 | Price et al. | |
| 5,852,630 A | 12/1998 | Langberg et al. | |
| 6,118,856 A | 9/2000 | Paarsmarkt et al. | |
| 6,405,243 B1 | 6/2002 | Nielsen | |
| 6,584,466 B1 | 6/2003 | Serbinis et al. | |
| 6,654,779 B1 * | 11/2003 | Tsuei | 718/101 |
| 6,745,239 B1 | 6/2004 | Hubbard | |
| 6,757,826 B1 | 6/2004 | Paltenghe | |
| 6,782,003 B1 * | 8/2004 | Giroux et al. | 370/466 |
| 6,920,483 B1 | 7/2005 | Cordray et al. | |
| 6,957,248 B2 | 10/2005 | Quine et al. | |
| 7,062,564 B2 * | 6/2006 | Gilbert | 709/227 |
| 7,155,608 B1 * | 12/2006 | Malik et al. | 713/170 |
| 7,325,067 B1 | 1/2008 | Isaac et al. | |
| 7,519,708 B2 * | 4/2009 | Malik | 709/225 |
| 2001/0007993 A1 | 7/2001 | Wu | |
| 2001/0049737 A1 | 12/2001 | Carolan et al. | |
| 2001/0051885 A1 * | 12/2001 | Nardulli et al. | 705/6 |

(Continued)

FOREIGN PATENT DOCUMENTS

CA 2295289 * 7/2000

OTHER PUBLICATIONS

IBM: "Drawing Pen for Free Space Cursor/Pointer Devices", IPCOM000099937D, Mar. 1, 1990, pp. 1-3.

(Continued)

*Primary Examiner* — Lashonda Jacobs
(74) *Attorney, Agent, or Firm* — Hanley, Flight & Zimmerman, LLC.

(57) ABSTRACT

Inconveniences in switching from one Internet service provider (ISP) to another ISP are remedied by providing streamlined approaches that facilitate the migration from one ISP to another ISP. In one embodiment, user information is validated prior to migrating from the old ISP to the new ISP, thereby ensuring proper transfer of information from the old ISP to the new ISP.

17 Claims, 19 Drawing Sheets

U.S. PATENT DOCUMENTS

| | | | |
|---|---|---|---|
| 2002/0004390 A1* | 1/2002 | Cutaia et al. | 455/424 |
| 2003/0101226 A1 | 5/2003 | Quine | |
| 2003/0105839 A1 | 6/2003 | Ben | |
| 2004/0054734 A1* | 3/2004 | Gilbert | 709/206 |
| 2004/0243574 A1* | 12/2004 | Giroux et al. | 707/3 |
| 2005/0004984 A1 | 1/2005 | Simpson | |
| 2005/0004989 A1 | 1/2005 | Satterfield et al. | |
| 2005/0080852 A1 | 4/2005 | Kelley et al. | |
| 2005/0080863 A1 | 4/2005 | Daniell | |
| 2005/0091364 A1 | 4/2005 | Bantz et al. | |
| 2005/0102415 A1 | 5/2005 | Ishiyama et al. | |
| 2006/0010214 A1* | 1/2006 | McDowell et al. | 709/206 |

OTHER PUBLICATIONS

FUSCO: "The Pitch to Switch", ISP—Business, Nov. 18, 2002, pp. 1-5.

ALSPACH; "PDF with Acrobat 5: Visual QuickStart Guide", Peachpit Press, Aug. 31, 2001, pp. 1-23.

MOTIVE; "Motive: BroadJump activates more than four million high-speed connections; Solution used in almost 70 percent of all North American broadband service activators in first quarter", M2 Presswire, Nov. 27, 2001.

Hu; "AOL Blocks Microsoft Net Messaging", Cnetnews.com, Jul. 23, 1999, pp. 1-2.

Sullivan; "TrueSwitch tool a key to MSN's fight with AOL", Computerworld, May 21, 2002.

http://www.trueswitch.com/index.htm; True Switch (specific pages include: Index (1 page); Copy (1 page); Notify (1 page); Forward (1 page); Cancel (1 page)); printed Aug. 12, 2003, (c) 2001-2003.

Elizabeth Millard, MSN Aims to Seduce AOL Users, May 22, 2002, E-Commerce Times, pp. 1-2.

Office action issued by the United States Patent and Trademark Office (USPTO) in connection with U.S. Appl. No. 10/462,244 on Nov. 9, 2006.

Office action issued by the United States Patent and Trademark Office (USPTO) in connection with U.S. Appl. No. 10/462,244 on Apr. 7, 2008.

Office action issued by the United States Patent and Trademark Office (USPTO) in connection with U.S. Appl. No. 10/462,244 on Jul. 25, 2008.

Office action issued by the United States Patent and Trademark Office (USPTO) in connection with U.S. Appl. No. 10/462,132 on Sep. 5, 2006.

Office action issued by the United States Patent and Trademark Office (USPTO) in connection with U.S. Appl. No. 10/462,132 on Mar. 29, 2007.

Office action issued by the United States Patent and Trademark Office (USPTO) in connection with U.S. Appl. No. 10/462,132 on Aug. 6, 2007.

Office action issued by the United States Patent and Trademark Office (USPTO) in connection with U.S. Appl. No. 10/462,132 on Feb. 8, 2008.

Office action issued by the United States Patent and Trademark Office (USPTO) in connection with U.S. Appl. No. 10/462,132 on Jun. 25, 2008.

Office action issued by the United States Patent and Trademark Office (USPTO) in connection with U.S. Appl. No. 10/462,132 on Dec. 9, 2008.

Office action issued by the United States Patent and Trademark Office (USPTO) in connection with U.S. Appl. No. 10/462,132 on Feb. 25, 2009.

Office action issued by the United States Patent and Trademark Office (USPTO) in connection with U.S. Appl. No. 10/462,132 on Jun. 9, 2009.

Office action issued by the United States Patent and Trademark Office (USPTO) in connection with U.S. Appl. No. 10/462,130 on Oct. 20, 2006.

Office action issued by the United States Patent and Trademark Office (USPTO) in connection with U.S. Appl. No. 10/462,130 on Apr. 3, 2007.

Office action issued by the United States Patent and Trademark Office (USPTO) in connection with U.S. Appl. No. 10/462,130 on Aug. 9, 2007.

Office action issued by the United States Patent and Trademark Office (USPTO) in connection with U.S. Appl. No. 10/462,130 on Jan. 24, 2008.

Interview Summary issued by the United States Patent and Trademark Office (USPTO) in connection with U.S. Appl. No. 10/462,130 on Apr. 14, 2008.

Office action issued by the United States Patent and Trademark Office (USPTO) in connection with U.S. Appl. No. 10/462,130 on Jul. 2, 2008.

Office action issued by the United States Patent and Trademark Office (USPTO) in connection with U.S. Appl. No. 10/462,130 on Dec. 18, 2008.

Office action issued by the United States Patent and Trademark Office (USPTO) in connection with U.S. Appl. No. 10/462,130 on Apr. 20, 2009.

Office action issued by the United States Patent and Trademark Office (USPTO) in connection with U.S. Appl. No. 10/462,130 on Dec. 7, 2009.

Office action issued by the United States Patent and Trademark Office (USPTO) in connection with U.S. Appl. No. 10/462,136 on Jun. 9, 2006.

Office action issued by the United States Patent and Trademark Office (USPTO) in connection with U.S. Appl. No. 10/462,136 on Dec. 6, 2006.

Office action issued by the United States Patent and Trademark Office (USPTO) in connection with U.S. Appl. No. 10/462,136 on May 14, 2007.

Office action issued by the United States Patent and Trademark Office (USPTO) in connection with U.S. Appl. No. 10/462,136 on Dec. 23, 2008.

Office action issued by the United States Patent and Trademark Office (USPTO) in connection with U.S. Appl. No. 10/462,136 on Mar. 9, 2009.

Office action issued by the United States Patent and Trademark Office (USPTO) in connection with U.S. Appl. No. 10/462,136 on Apr. 23, 2009.

Office action issued by the United States Patent and Trademark Office (USPTO) in connection with U.S. Appl. No. 10/462,136 on Oct. 30, 2009.

* cited by examiner

BellSouth® Welcome Service

AOL® User

BellSouth® Welcome Service will help you make your change as easy as possible.

─── This Welcome Service will... ─── 208

1. Forward all incoming e-mail from your AOL® account to your new BellSouth® e-mail address as long as your AOL® account is open. The Welcome Service will forward your mail for a maximum of 30 days.

2. Automatically send your AOL® contacts your new BellSouth® e-mail address.

3. Send you a reminder and convenient form to use for canceling your AOL® account.

4. Help instant messaging users stay in contact with old AOL® buddies and new BellSouth® Messenger friends.

─── Getting Started Checklist ─── 210

To use the Welcome Service you will need to know:

1. Your current AOL® screen name and password

2. Your new BellSouth® Internet Service user name and password.

If you do not have this information available, you can bookmark this page and return when you are ready to continue.

*BellSouth®* Internet Service

 212    214 

FIG. 2B

① Forward and Notify | ② Help Canceling AOL  *YOU ARE HERE* | ③ Start using BellSouth®

Help Canceling

Using your computer mouse, please sign your name in the box below to authorize BellSouth® to FAX the request to cancel your AOL® Account.

291

INSTRUCTIONS:
1. Place cursor inside the box where you want to start your signature.
2. Using the left mouse button, press and hold down.
3. Holding the left mouse button down, move the mouse to sign.
4. Release the button to move to next part of your name. Press and hold left mouse button to continue signature in separate spot.
5. If you want to start your signature over, click Clear Signature.
6. Click Preview Letter and print a copy of the letter for your records.
7. When finished, click Continue.

Demo    298

*This is an electronic signature and may not match your signature as written on paper using a pen or pencil.*

293 — Clear Signature    Preview Letter — 295

You will receive a confirmation that BellSouth® sent the FAX on your behalf to cancel your AOL® account. The FAX is scheduled to be sent no sooner than 25 days from today.

Please remember you are ultimately responsible for canceling your account with AOL® and the FAX is being sent as a courtesy. BellSouth® is not liable for any charges from AOL® in the event AOL® does not cancel your account after the FAX has been sent.

*BellSouth® Internet Service*   284

283 — ◁ Back   Continue ▷

FIG. 2F

FIRST ISP DATABASE

| USER ID | OLD ISP USERNAME | OLD ISP PASSWORD (ENCRYPTED) | NEW ISP USERNAME | NEW ISP PASSWORD (ENCRYPTED) | SWITCH DATE | 30-DAY EXPIRATION | STATUS (NEXT RUN-TIME) |
|---|---|---|---|---|---|---|---|
| 1 | LARRY | ********** | TOM | ********** | 20 Dec, 2002 16:14:49 -0000 | 19 Jan, 2003 16:14:49 -0000 | INACTIVE |
| 2 | CURLY | ********** | DICK | ********** | 15 Apr, 2003 02:29:10 -0000 | 15 May, 2003 02:29:10 -0000 | INACTIVE |
| ... | ... | ... | ... | ... | ... | ... | ... |
| n | MOE | ********** | HARRY | ********** | 31 May, 2003 20:12:19 -0000 | 01 Jul, 2003 20:12:19 -0000 | ACTIVE |

VALIDATING USER INFORMATION PRIOR TO SWITCHING INTERNET SERVICE PROVIDERS

RELATED APPLICATIONS

The present application is a continuation of U.S. application Ser. No. 10/462,244 filed Jun. 16, 2003, now abandoned, which claims priority from U.S. provisional patent application Ser. No. 60/478,439, filed on Jun. 12, 2003, which are hereby incorporated herein by reference in their entireties.

FIELD OF THE DISCLOSURE

The present disclosure relates generally to communications and, more particularly, to digital communications.

BACKGROUND

With increasing Internet traffic, many Internet service providers (ISPs) have emerged. These ISPs compete for customers, often resulting in customers switching from one ISP to another for several reasons such as cost, customer satisfaction, availability of email options, availability of instant messaging (IM) options, etc. Unfortunately, when a customer of one ISP switches services to another ISP, that customer must often maintain two separate accounts during a transition period. Additionally, when initially switching from one ISP to another, the customer typically must traverse a number of hurdles to properly acclimate to the new ISP environment. In view of the inconveniences during the transition period and, also, in view of the inconveniences associated with the initial switching process, a need exists in the industry.

SUMMARY

The present disclosure provides for facilitating migration from an old Internet service provider (ISP) to a new ISP. In one embodiment, user information is received in response to prompting by the new ISP, and the received user information is validated. The user information may include an old ISP user name, an old ISP password, a new ISP user name, and a new ISP password.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A through 2G are embodiments of user interfaces associated with a system for switching from an old ISP to a new ISP.

FIG. 4 is a diagram showing contents of a database having user information.

DETAILED DESCRIPTION OF THE PREFERRED EMBODIMENTS

Figure 1:
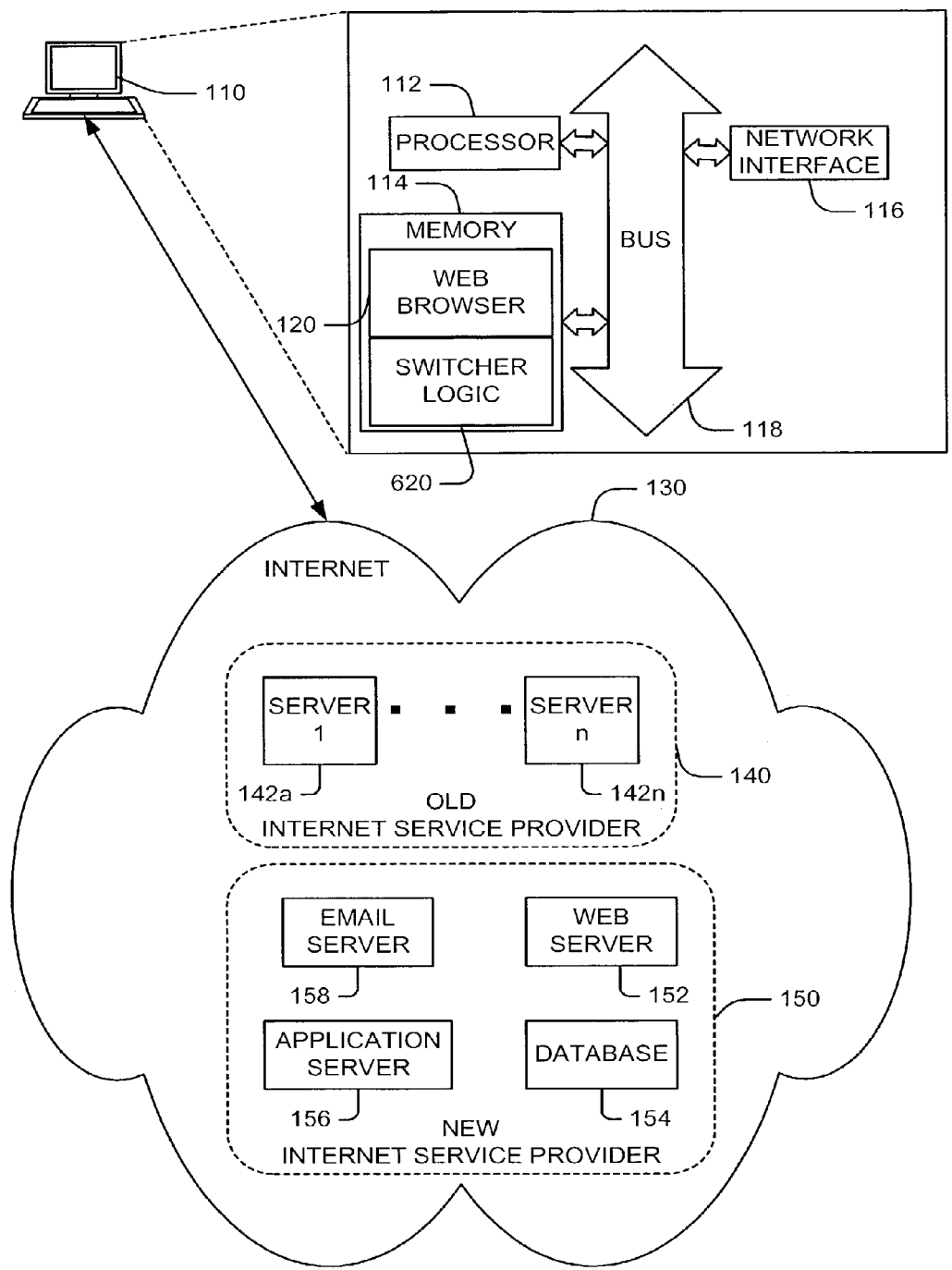
FIG. 1 is a block diagram showing an embodiment of a digital communication environment having a user workstation and several Internet service providers (ISPs).

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

One of the inconveniences in switching from one Internet service provider (ISP) to another ISP is the inconvenience of having two separate email accounts. By having email messages directed to two separate email accounts, a user must typically access both accounts in order to retrieve all of the user's email messages. Alternatively, the user may have to set up a forwarding scheme that forwards all incoming messages at one ISP to another ISP, which introduces additional problems. The following disclosure provides a streamlined approach to consolidating email messages so that a user only needs to access an email account at one ISP to retrieve all of the user's email messages.

Another inconvenience associated with switching ISPs is the inconvenience of having to transfer information stored on one ISP to another ISP. For example, a user's contact list that is stored on one ISP may be different from a user's contact list at another ISP. Hence, if the user chooses to communicate with a contact from an old ISP using the resources of a new ISP, then the user must often recreate the information from the old ISP at the new ISP. The following disclosure also provides a streamlined approach that simplifies the consolidation of a user's contact information for instant messaging (IM).

Yet another inconvenience associated with switching ISPs is the inconvenience of having to cancel the old ISP service. For example, in order to cancel ISP services, a user must often contact the old ISP in writing to apprise the old ISP of the user's intent to cancel services of the old ISP. The following disclosure provides a mechanism by which the cancellation is automatically provided for the user to the old ISP by the new ISP, thereby relieving the user of much of the hassle associated with the user manually canceling the old ISP service.

FIG. 1 is a block diagram showing an embodiment of a digital communication environment having a user workstation 110 and several Internet service providers (ISPs) 140, 150. As shown in FIG. 1, the user workstation 110 is coupled to a network, such as the Internet 130, thereby permitting communication between the user workstation 110 and any servers or other clients that may be connected to, or located within, the Internet 130. The example environment of FIG. 1 also includes an old ISP 140 and a new ISP 150 coupled to the Internet 130. In this regard, the user workstation 110 is able to communicate with the old ISP 140 and the new ISP 150 over the Internet 130. Similarly, the new ISP 150 is able to communicate with the old ISP 140 over the Internet 130.

The user workstation 110 includes a processor 112, a network interface 116, a memory 114, and a bus 118 that permits communication between the various components. The memory 114 represents any type of storage component such as volatile memory, non-volatile memory, a hard-drive, a removable disk drive, etc. In an example embodiment, the processor 112 is configured to access any program that is stored in memory 114, and execute the program. In the embodiment of FIG. 1, a web browser 120 is shown as being loaded into memory 114 at the user workstation 110, thereby permitting the user workstation 110 to request and receive web pages, or post data to web-servers over the Internet 130. Since the requesting and posting of web pages are well known in the art, further discussion of the web browser 120 is omitted here. As shown in FIG. 1, the memory 114 is shown to include switcher logic 620, which provides a mechanism for facilitating the switching from one ISP to another ISP. It should be appreciated that the switcher logic 620, as discussed in greater detail below, facilitates the switching from one ISP to another ISP. In some embodiments, the switcher logic 620 may be implemented in software such as computer-readable instructions that are executed by the processor 112. Since processors, memory components, and other computing components are known in the art, further discussion of such components is omitted here. However, it should be appreciated that the processes carried out by these various components may be performed in a distributed network or in a single device. Similarly, while the example embodiments show a single device housing the various components, it should be appreciated that the various components may be located over a network, thereby permitting distributed computing or distributed processing.

The network interface 116 is configured to provide an interface between the user workstation 110 and the Internet 130. Thus, the network interface 116 provides the interface for the user workstation 110 to receive any data that may be entering from the Internet 130 and, also, to transmit any data to the Internet 130. Specifically, in some embodiments, the network interface 116 is configured to permit communication between the user workstation 110 and the components of the old ISP 140 (discussed in greater detail below), as well as components of the new ISP 150 (discussed in greater detail below). In this regard, the network interface 116 may be a modem, a network card, or any other interface that interfaces the user workstation 10 to the Internet 130. Since various network interfaces and network communication protocols are known in the art, further discussion of network interfaces and network communication protocols is omitted here. It should be understood that the web browser 120 may be conventional or may be custom tailored to specific needs.

The old ISP 140 comprises a number of servers 142*a* . . . 142*n*, which are configured to provide software applications (or data) to clients such as the user workstation 110, which requests the software applications or data. The software applications may include programs such as email applications, instant messaging (IM) applications, etc. The data may include static or dynamic web pages, stored email messages, or other data available at the old ISP 140. While not explicitly shown, it should be appreciated that each of the servers 142*a* . . . 142*n* may also include processors and memory components that facilitate data transfer between the servers 142*a* . . . 142*n* and the client machines that request information from the servers 142*a* . . . 142*n*.

In some embodiments, at least one of the servers 142*a* in the old ISP 140 stores the email account of a user. In this regard, that server 142*a* may employ a post-office-protocol 3 (POP3), an Internet message access protocol (IMAP), or any other email protocol. Thus, when a user wishes to access an email account at the old ISP 140, the user may execute an email client at the user workstation 10, which retrieves the email messages from the email server 142*a* using POP3, IMAP, or other appropriate email protocol. Since the retrieval of email messages is known in the art, further discussion of the email retrieval from email servers is omitted here. It should be appreciated that, in some embodiments, the servers 142*a*. . . 142*n* in the old ISP 140 may also store a user's instant messaging (IM) account, which may be accessible from the user workstation 110 using an appropriate IM protocol. Since several IM protocols are known in the art, these protocols are not discussed herein.

The new ISP 150, in some embodiments, comprises an email sever 158, a web server 152, an application server 156, and a database 154. The web server 152 provides web pages that are used to facilitate switching of services from the old ISP 140 to the new ISP 150. Several examples of web pages provided by the web server 152 are shown in FIGS. 2A through 2G. The web server 152 is also configured to receive user information over the Internet and store the information in the database 154. The database 154 is configured to store the received user information. The user information may include login names and passwords for user accounts on both the old ISP 140 and the new ISP 150. Additionally, the user information may include other information that may facilitate migration firm the old ISP 140 to the new ISP 150. An embodiment of the database 154 is shown in greater detail in FIG. 4. The application server 156 is configured to retrieve user information from the database 154. Using the retrieved user information, the application server 156 is configured to access the user's email account at the old ISP 140 and forward all email messages at the old ISP 140 to the email server 158 at the new ISP 150. Embodiments of a method to forward email messages are shown with reference to FIGS. 5A through 5C. The email server 158 is configured to receive the forwarded email messages from the old ISP 140. Additionally, the email server 158 is configured to provide an email account to a user, thereby permitting the user to access email messages stored at the email server 158. In this regard, the email server may employ POP3, IMAP, or other email protocols. While the embodiment of FIG. 1 shows the application server 156 performing the steps related to forwarding email messages, it should be appreciated that, in other implementations, the steps may be performed at the client side using dedicated software installed at the client. The application server 156 of FIG. 1 performs the steps that were previously performed manually by a user. In this regard, the application server 156 automatically issues commands and receives responses, which were previously issued and received as a result of manual interplay between a user and a workstation. In other words, the process at the application server 156 may be seen as an automation of a previous manually implemented process. Thus, the application server 156 may be seen as a proxy for the user in that an automated computing process performs the steps that were previously performed manually by users.

FIGS. 2A through 2G illustrate embodiments of user interfaces associated with a system for switching from an old ISP 140 to a new ISP 150. While FIGS. 2A through 2G show specific examples of ISPs (e.g., America On-Line (AOL®), Microsoft Network (MSN), EarthLink, etc.), it should be appreciated that the user interfaces may be altered to accommodate transition from any one ISP to any other ISP. When a user wishes to switch from an old ISP 140 to BellSouth®, the user may access an introductory web page 202 similar to that shown in FIG. 2A. The introductory web page 202 includes a list of old ISPs, which are presented to the user as user-selectable icons 204. These user-selectable icons 204, in some embodiments and for some users, represent "old" (or soon-to-be canceled) ISPs such as AOL®, MSN, AT&T, EarthLink, DirecTV DSL, or other ISPs. An icon 206 to close the window is also provided at this point, in the event that the user chooses not to switch to BellSouth®. If, however, the user chooses to proceed, then subsequent web pages are provided to the user. FIGS. 2B through 2G show specific examples of subsequent web pages in which the user has specifically chosen to switch from AOL® to BellSouth®.

Figure 2A:
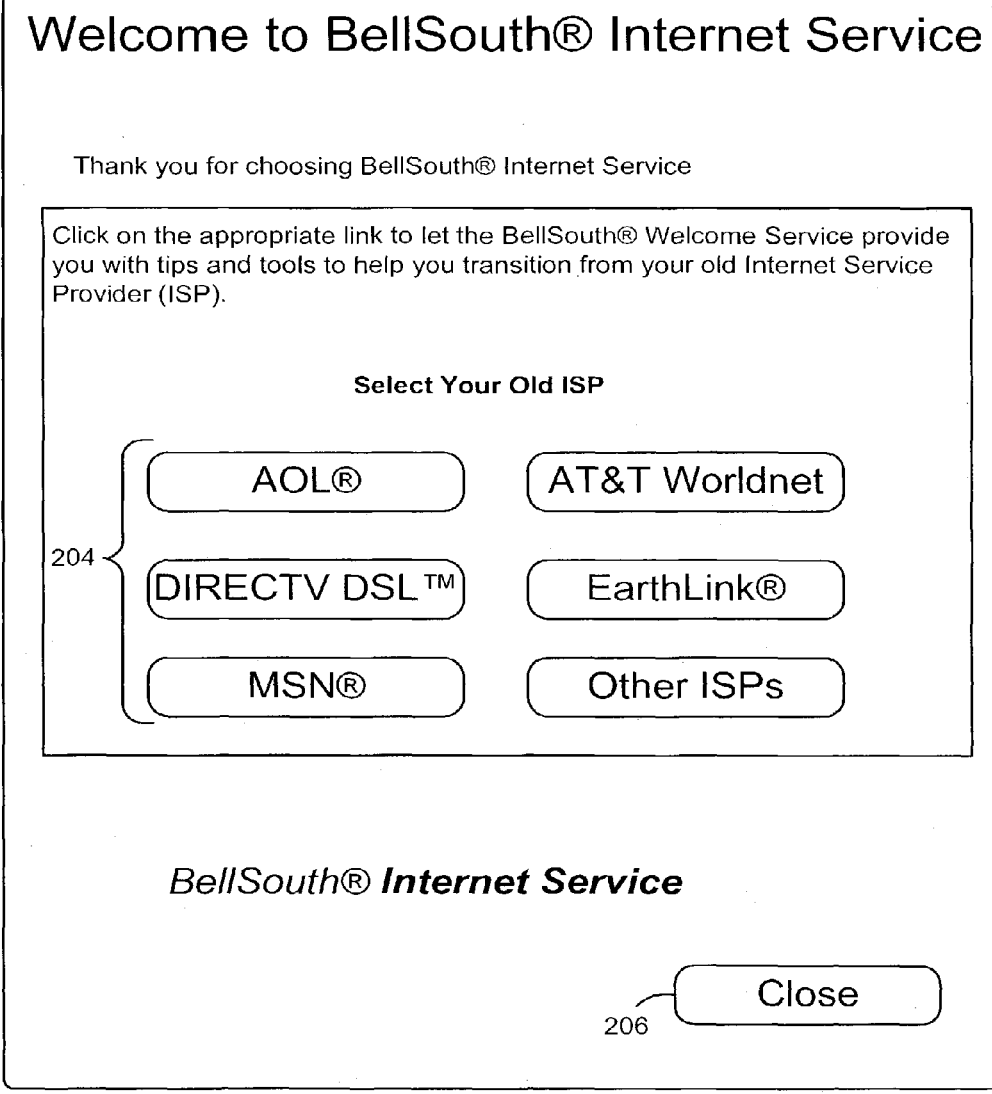

The web page of FIG. 2B is requested and displayed to the user when the user selects AOL® from the user-selectable icons 204 of FIG. 2A. The web page of FIG. 2B includes an introduction paragraph 208 that apprises the user of several features associated with the switching service. Also, the web page of FIG. 2B includes a paragraph that apprises the user of the information that is required to switch from AOL® to BellSouth®. Additionally, the web page of FIG. 2B provides two user-selectable buttons 214, 212 to either proceed with the process, or return to the introductory web page 202. If the user chooses to proceed, then the web page of FIG. 2C is requested and, when received, displayed to the user.

Figure 2C:
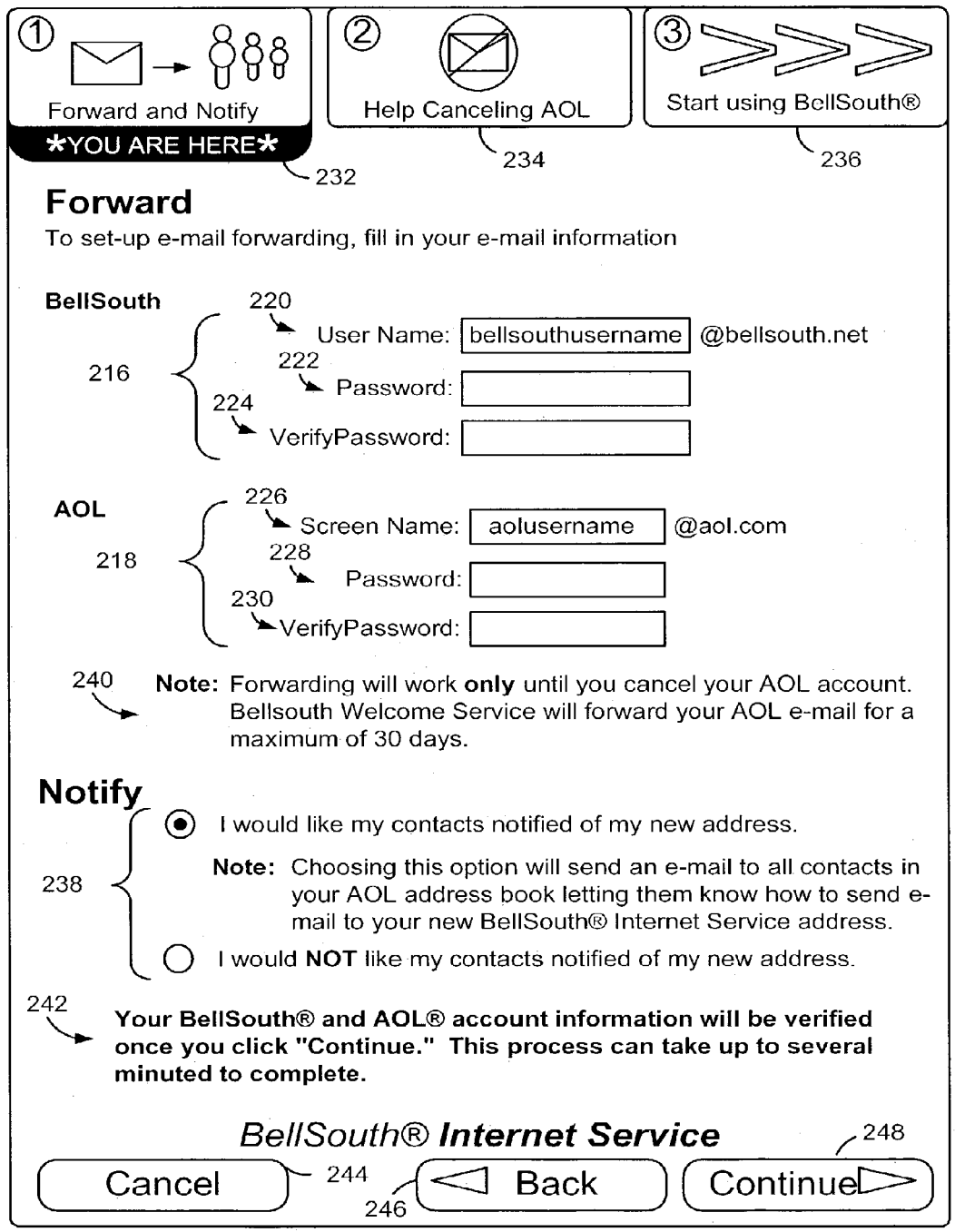

As shown in the web page of FIG. 2C, the user workstation 110 requests BellSouth® user information 216 as well as AOL® user information 218. The web page of FIG. 2C provides input areas 220, 222, 224 that are configured to receive user inputs for a BellSouth® user name, a BellSouth® password associated with that BellSouth® user name, and a verification of the BellSouth® password. Similarly, the web page of FIG. 2C provides input areas 226, 228, 230 that are configured to receive user inputs for an AOL® user name, an AOL® password associated with that AOL® user name, and a verification of the AOL® password. Moreover, the web page of FIG. 2C provides additional information 240, 242 related to the switching services provided by the BellSouth® switching system.

In addition to the user information 216, 218, the web page of FIG. 2C provides user-selectable icons 238 that provide an option on whether or not to notify all of the user's AOL® contacts that the user has switched services from AOL® to BellSouth®. The web page of FIG. 2C also provides user-selectable icons 244, 246, 248 that permit the user to cancel the process, return to the previous web page of FIG. 2B, or continue to the web page of FIG. 2D. If the user chooses to proceed, then the entered user information is validated. When all information is properly validated, the web page of FIG. 2D is requested and, when received, displayed to the user.

Figure 2D:
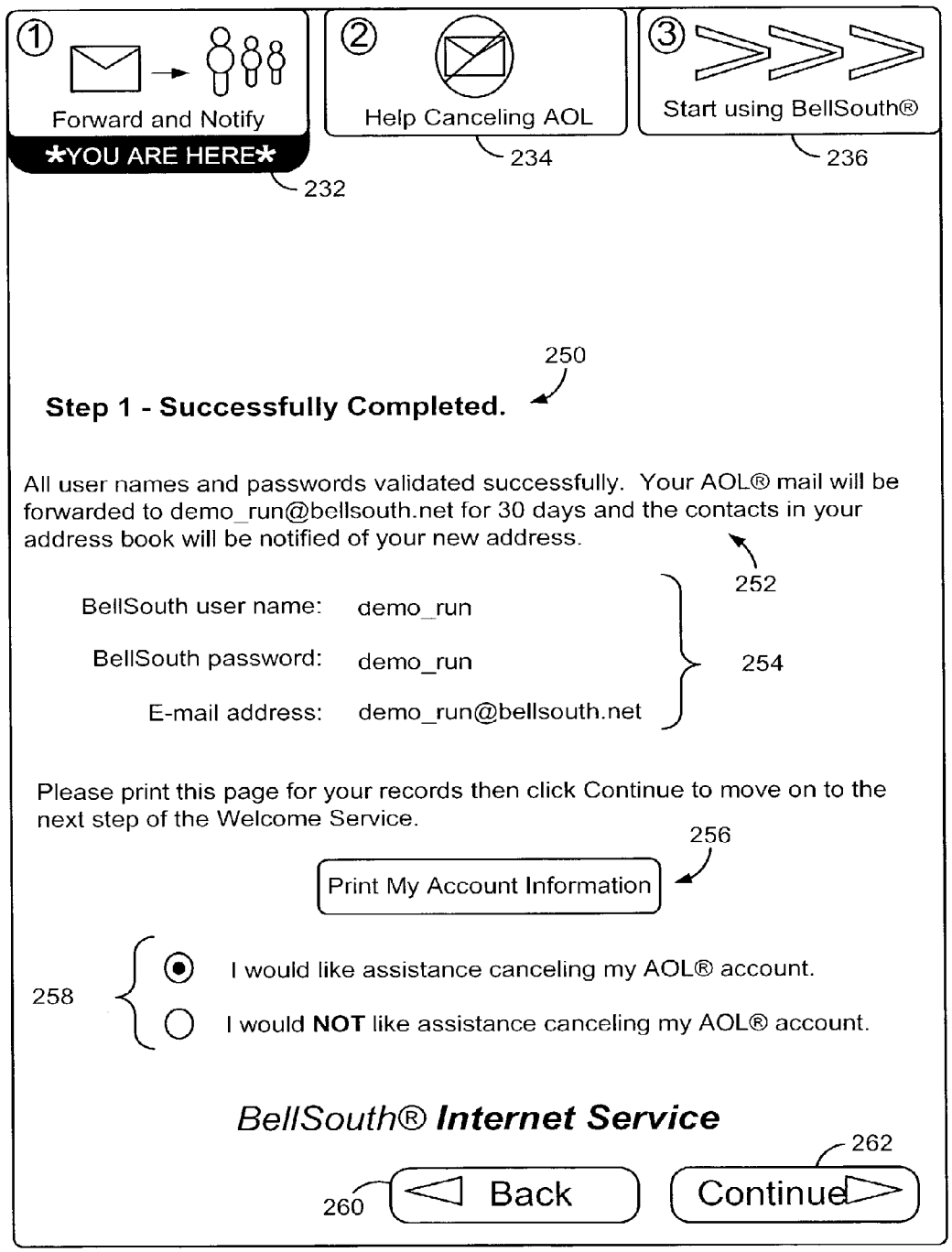

As shown in FIG. 2D, the displayed web page includes icons 232, 234, 236 that indicate to the user how much of the process has been completed. Additionally, if all information is properly validated, then the web page provides an indication 250 that the user information has been successfully validated. The web page of FIG. 2D further provides information 252 indicative of future processes that may assist the user during transition from AOL® to BellSouth®. Furthermore, information 254 related to the user's new BellSouth® account is provided in the web page of FIG. 2D, along with a user-selectable icon 256 that permits the user to print the new BellSouth® account information. Also, in order to simplify cancellation of the user's old AOL® account, the web page of FIG. 2D provides user-selectable icons that enable the user to solicit assistance in canceling the user's old AOL® account. The web page of FIG. 2D further provides user-selectable icons ("back" 260 and "continue" 262) that permit the user to either proceed with the switching process or, alternatively, return to the web page of FIG. 2C. If the user solicits assistance in canceling the user's old AOL® account, then the process continues to the web page of FIG. 2E upon selection of the "continue" icon 262. If, however, the user does not seek assistance in canceling the user's old AOL® account, then the process continues to the web page of FIG. 2G upon selection of the "continue" icon 262.

Figure 2E:
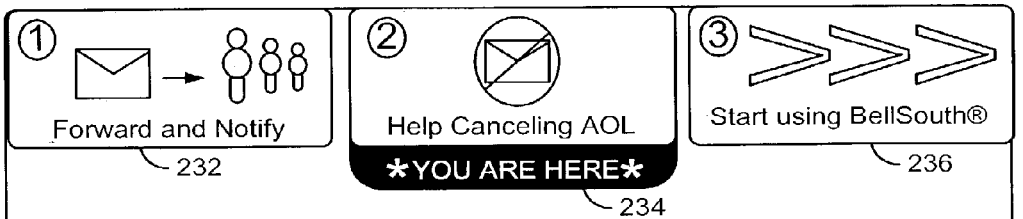

The web page of FIG. 2E provides input areas 264 for AOL®-related user information such as the AOL® screen name 266, the user's first name 268, the user's last name 270, the user's street address 272, city 274, state 276, zip code 278, telephone number 280, and any other information that may be required to cancel the user's AOL® account. The web page of FIG. 2E also provides the user with options 282 on whether the user wishes to notify AOL® directly, or whether the user wishes BellSouth® to notify AOL® on behalf of the user. If the user chooses to notify AOL® directly, then a pre-written form letter having the user's information may be displayed for the user to print, sign, and send to AOL®. If, however, the user chooses to have BellSouth® notify AOL® on behalf of the user, then the process continues to FIG. 2F upon selection of the "continue" icon 288.

Many ISPs require a user's written notification and signature in order to cancel the ISP services. In this regard, if a user chooses to solicit BellSouth®'s assistance in canceling the user's AOL® account, the user must typically provide a signature. The web page of FIG. 2F provides a mechanism by which a user's signature may be captured. Specifically, the web page of FIG. 2F provides an input area 298 that is configured to receive a graphical marking such as a user's signature. Along with the input area 298, instructions 291 are provided on how the user may electronically provide a signature. When a user provides a signature in the input area 298, the user may either clear the signature by selecting the "clear signature" icon 293, or may preview the pre-written letter with the user's signature by selecting the "preview letter" icon 295. Embodiments of processes for capturing the signature and generating the pre-written letter are shown in greater detail with reference to FIG. 7. Once the user has chosen to preview the letter and have it sent to AOL® on behalf of the user, the user may select the "continue" icon 284, which requests the web page of FIG. 2G.

Figure 2G:
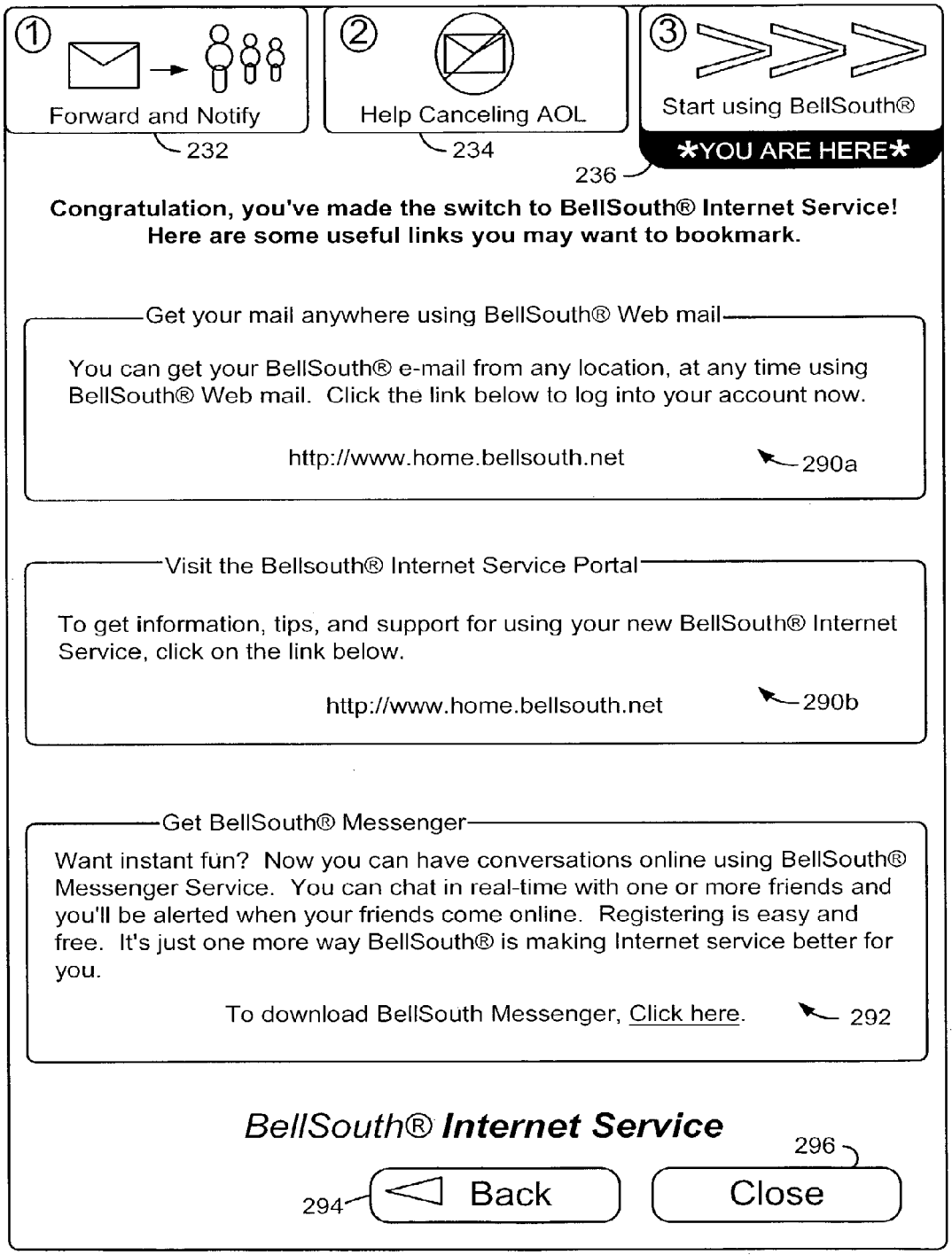

The web page of FIG. 2G provides additional information and links 290a, 290b to websites that may be helpful in acclimating the new user to BellSouth®'s services. The web page of FIG. 2G also provides an icon 292 that further assists the user in obtaining instant messaging (IM) services from BellSouth®, thereby consolidating many of the user's digital communication services with a single ISP (e.g., BellSouth®). A user-selectable icon 296 to close the window is also provided on the web page of FIG. 2G. Hence, when the user has completed the switching process, the user may exit the process by selecting the user-selectable icon 296.

As shown in the specific example of FIGS. 2A through 2G, the interactive web pages provide a simpler approach to switching from an old ISP 140 to a new ISP 150. While, specifically, user interfaces that facilitate a switch from AOL® to BellSouth® have been described, it should be appreciated that the user interfaces may be modified to include additional information and additional options, or to omit some information or options.

Having shown specific user interfaces in FIGS. 2A through 2G, attention is turned to FIGS. 3A through 3E, which show data-flow diagrams in a method for switching from an old ISP 140 to a new ISP 150. In this regard, the data-flow diagrams of FIGS. 3A through 3E show, more generally than the user interfaces of FIGS. 2A through 2G, an embodiment of a method for switching from an old ISP 140 to a new ISP 150.

Figure 3A:
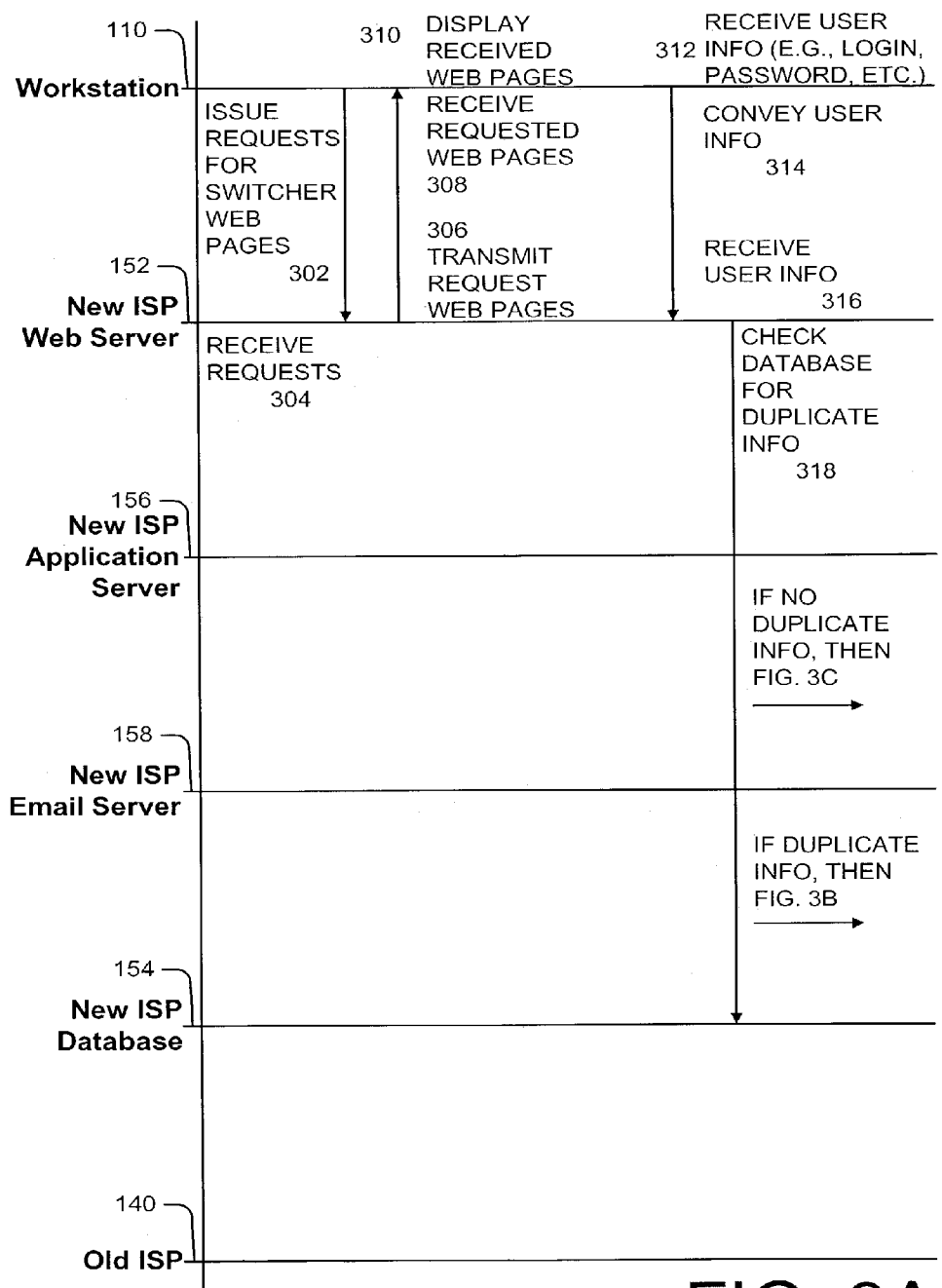
FIGS. 3A through 3E are data-flow diagrams showing an embodiment of a method for switching from an old ISP to a new ISP.

As shown in FIG. 3A, some embodiments of the process begin when a user inputs, at a web browser on a workstation 110, the web address for a web-based switcher application. The workstation then issues (302) requests to a new ISP web server 152 for the switcher application web pages. The new ISP web server 152 receives (304) the request and transmits (306) the requested web pages back to the workstation 110. The workstation 110 receives (308) the requested web pages and displays (310) the web pages to the user. In some embodiments, the requested web pages may include input areas for user information, similar to those input areas shown in FIGS. 2A through 2G. In this regard, the displayed web pages serve to prompt the user for user information. Once the user enters the user information, the user information is received (312) by the workstation 110 and conveyed (314) to the new ISP web server 152. The user information may include an old ISP login name, an old ISP password, a new ISP login name, a new ISP password, preferences associated with whether or not contacts should be notified of the switch, etc. An example of information stored in the database 154 is shown with reference to FIG. 4. The new ISP web server 152 receives (316) the user information and checks (318) the database 154 to determine whether or not the database contains duplicative information. In other words, the web server 152 checks (318) the database 154 to determine whether or not the user information is already contained in the database 154. In some embodiments, if any duplicative information is found in the database 154, then the process continues to FIG. 3B. If, however, no duplicative information is found in the database 154, then the process continues to FIG. 3C. In other embodiments, the degree of duplication may be considered. For example, the database 154 may contain the old ISP user name but not the new ISP user name; the database 154 may contain the new ISP user name but not the old ISP user name, etc.

Figure 3B:
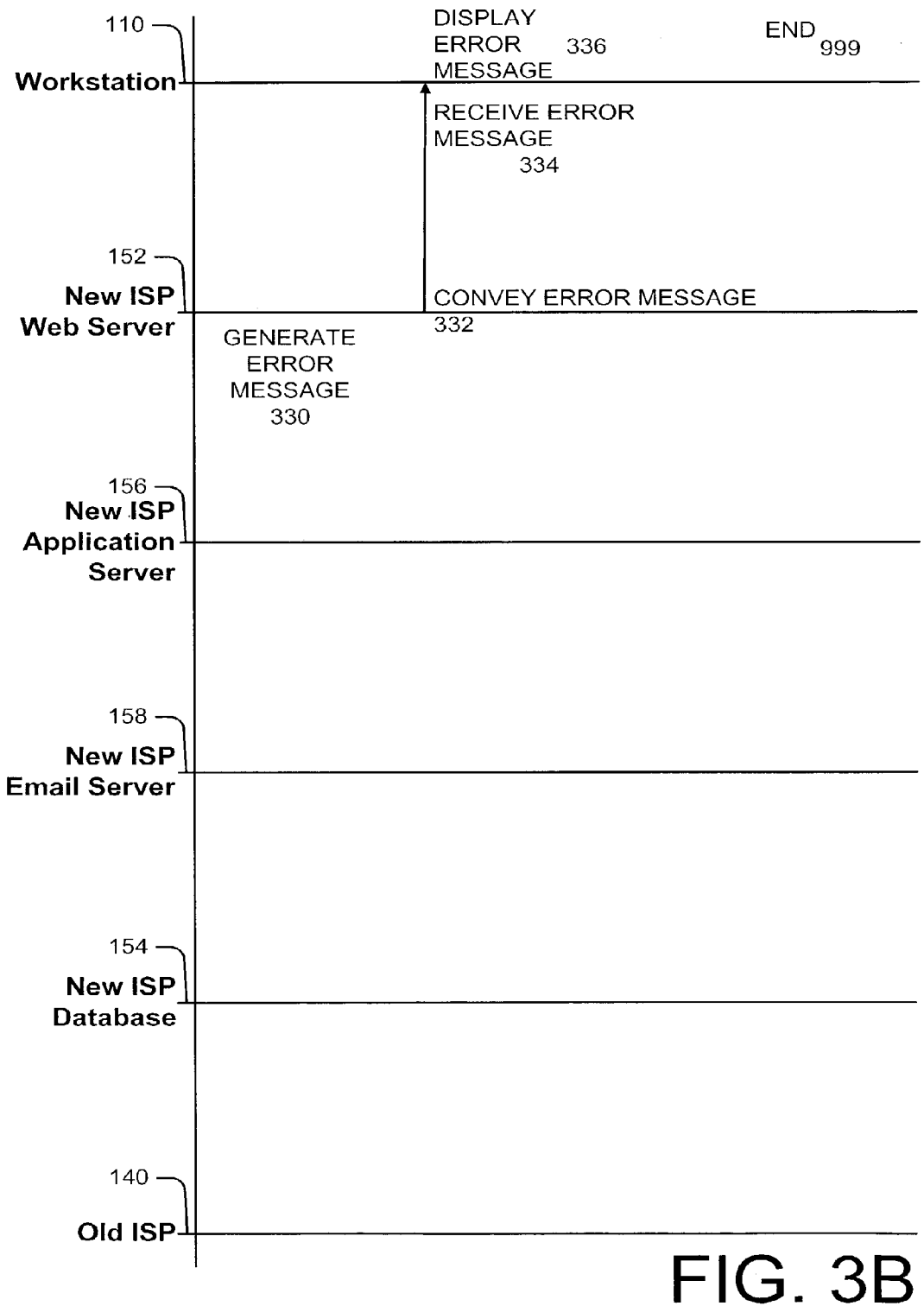

Continuing in FIG. 3B, if duplicate information is found in the database 154, then the new ISP web server 152 generates (330) an error message and conveys (332) the error message to the workstation 110. The workstation 110 receives (334) the error message from the new ISP web server 152 and displays (336) the error message to the user. Thereafter, the process terminates (999).

Figure 3C:
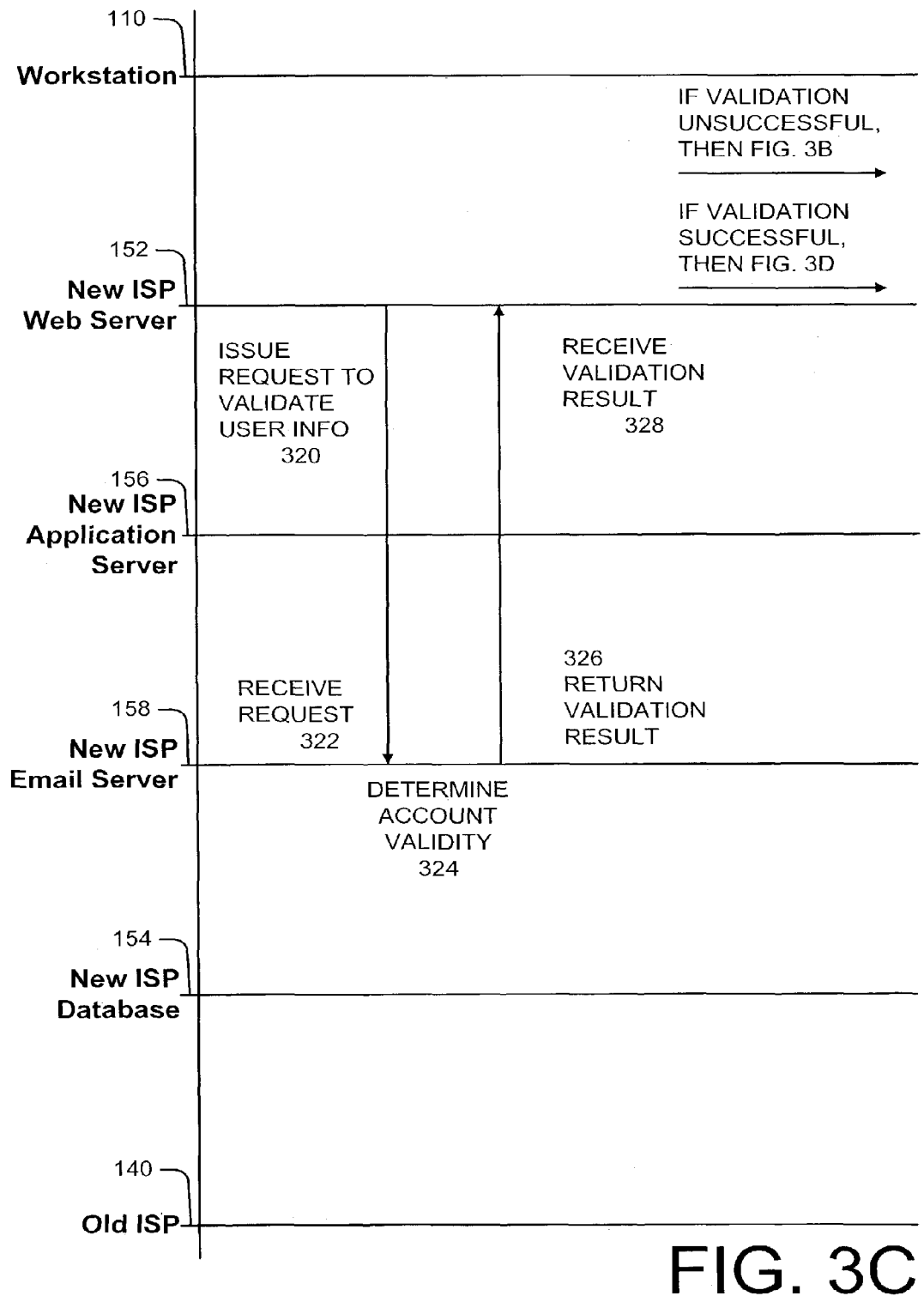

As shown in FIG. 3C, if no duplicate information is found in the database 154, then the new ISP web server 152 issues (320) a request to the new ISP email server 158 to validate the user information (e.g., user name, password, etc.) associated with the user's new ISP email account. The new ISP email server 158 receives (322) the request and determines (324) whether or not a valid account exists for the user. The result of the validation process is returned (326) from the new ISP email server 158 to the new ISP web server 152, which receives (328) the validation result. If the validation result indicates that the validation was unsuccessful, then the process continues to FIG. 3B, where the new ISP web server 152 generates (330) an error message. If, on the other hand, the validation result indicates that the validation was successful, then the process continues to FIG. 3D. Specifically, in some embodiments, the validation process may employ POP3 for validating email accounts. As such, the process may include the issuing of a POP3 "USER" command to the new ISP email server 158. The new ISP email server 158 receives the USER command and replies with either an "OK," which indicates that the user account is present or otherwise available, or an "ERR," which indicates that the user account is either not present or otherwise inaccessible. The reply is transmitted from the new ISP email server 158 back to the workstation 110. If a positive reply (e.g., "OK") is received at the workstation 110, then the workstation issues a POP3 "PASS" command to validate the password. The PASS command is received by the new ISP email server 158, which, again, replies with an OK or an ERR.

Figure 3D:
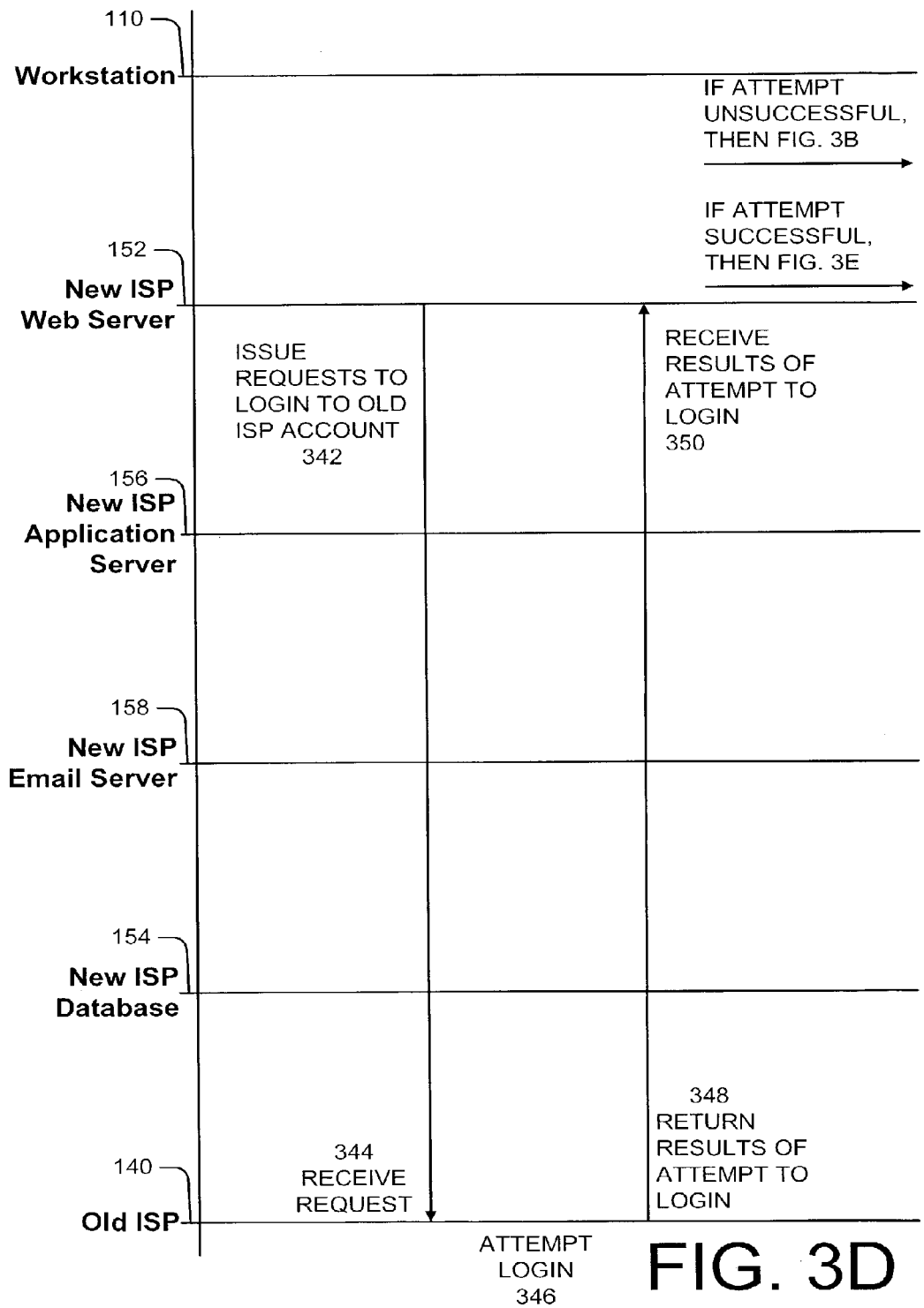

As shown in FIG. 3D, after validating the new ISP email account, the new ISP web server 152 issues (342) requests to the old ISP 140 to login to the user's old ISP email account. The old ISP 140 receives (344) the requests and attempts (346) to login to the user's old ISP email account. The results of the attempted login are returned (348) from the old ISP 140 back to the new ISP web server 152, which receives (350) the results of the attempted login. If the attempted login was unsuccessful, then the process continues to FIG. 3B, where the new ISP web server generates (330) an error message. If, on the other hand, the attempt to login to the old ISP email account was successful, then the process continues to FIG. 3E. Again, POP3 may be used to validate the old ISP email account. In this regard, the POP3 process described with reference to FIG. 3C may be similarly employed in the process of FIG. 3D.

Figure 3E:
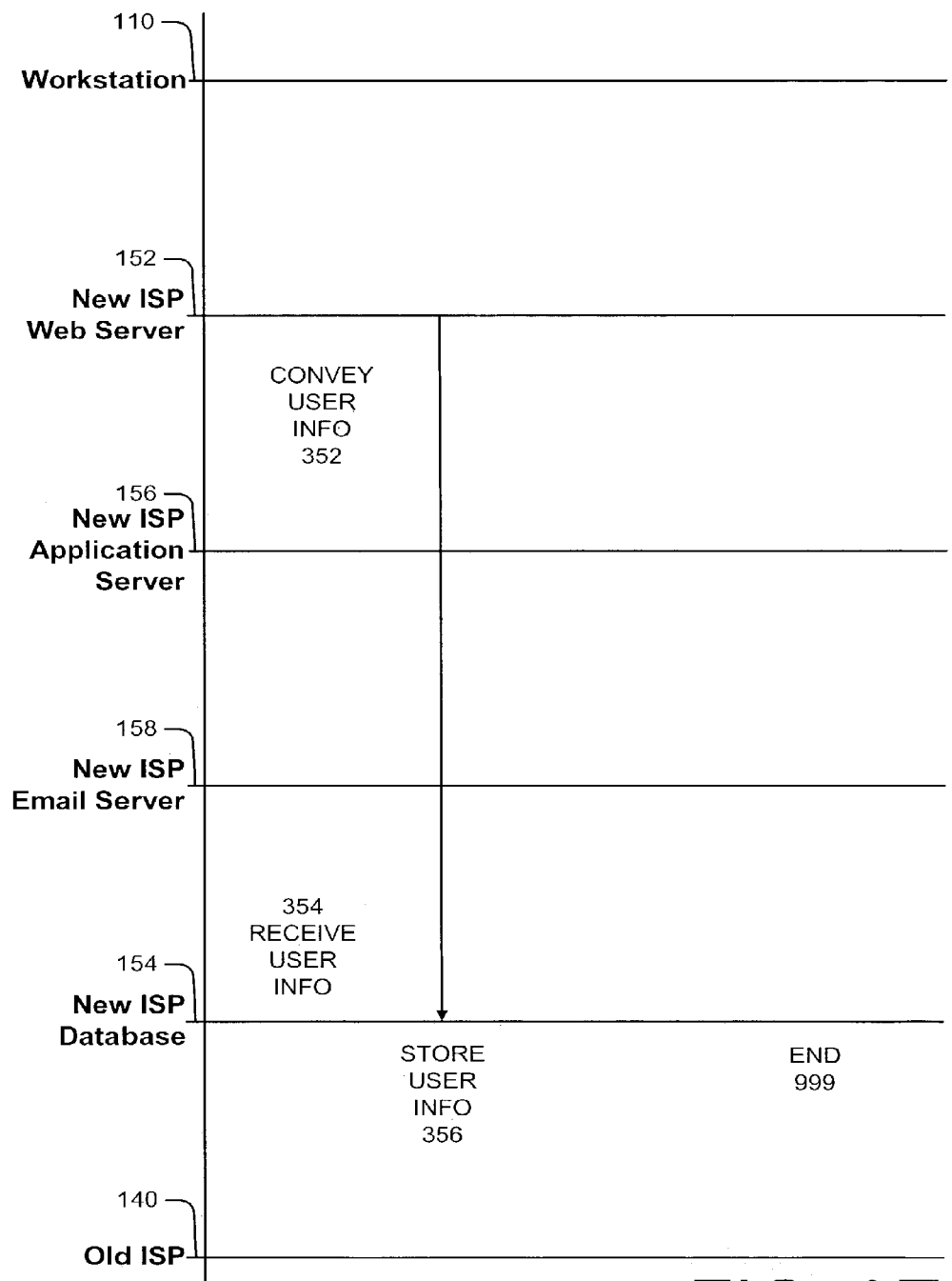

As shown in FIG. 3E, if all attempts are successful, then the new ISP web server 152 conveys (352) the user information to the database 154, which receives (354) the user information and stores (356) the user information. Thereafter, the process terminates (999).

In some embodiments, the system may be configured to save only the validated user information. Thus, if the new ISP user name and password are determined to be valid but the old ISP user name and password are determined to be invalid, then the system may be configured to store only the new ISP user name and password. Similarly, if only the old ISP user name and password are determined to be valid, then the system may be configured to store only the old ISP user name and password. It should, therefore, be appreciated that the storing of information may be configured in many different ways without detracting from the scope of the invention. Additionally, while the embodiment of FIGS. 3A through 3E show that the old ISP user name and password have a one-to-one correlation with the new ISP user name and password, it should be appreciated that a single new ISP user name and password may be associated with multiple old ISP user names and passwords, or vice versa.

As shown in the embodiment of FIGS. 3A through 3E, the web server 152 and the database 154 facilitate the migration from an old ISP to a new ISP by removing some of the hurdles that are normally associated with the migration process.

FIG. 4 is a diagram showing contents of a database 154 having user information. As shown in FIG. 4, the database 154 contains user information for multiple users. Each user is assigned a user identification (ID). Hence, each user's old ISP user name, old ISP password, new ISP user name, and new ISP password are correlated to the user ID. In addition to the information provided by the user, a switch date is also correlated to the user ID. Hence, the database 154 provides information on when the user has switched services from an old ISP to a new ISP. In some embodiments, the system is configured to forward email messages from the old ISP email account to the new ISP email account for a fixed number of days, such as, for example, 30 days. For those embodiments, each user ID in the database 154 is also correlated to a 30-day expiration, which is 30 days from the switch date. Additionally, in order to forward all email messages of all users in an organized manner, the database also contains a status indication for each of the user IDs. The use of the 30-day expiration and the status indication are explained in greater detail below with reference to FIGS. 5A through 5C. For security reasons, in some embodiments, both the old ISP password and the new ISP password are encrypted in the database 154. While specific examples of data entries are shown in FIG. 4, it should be appreciated that some entries may be deleted and other entries may be added to the database 154 depending on the various system configurations. For example, the new ISP password need not be present in the database if the system will only be accessing the old ISP email account. While the forwarding of email, for this embodiment, is set to expire in 30 days, it should be appreciated that the expiration date may be lengthened or shortened as desired.

Figure 5A:
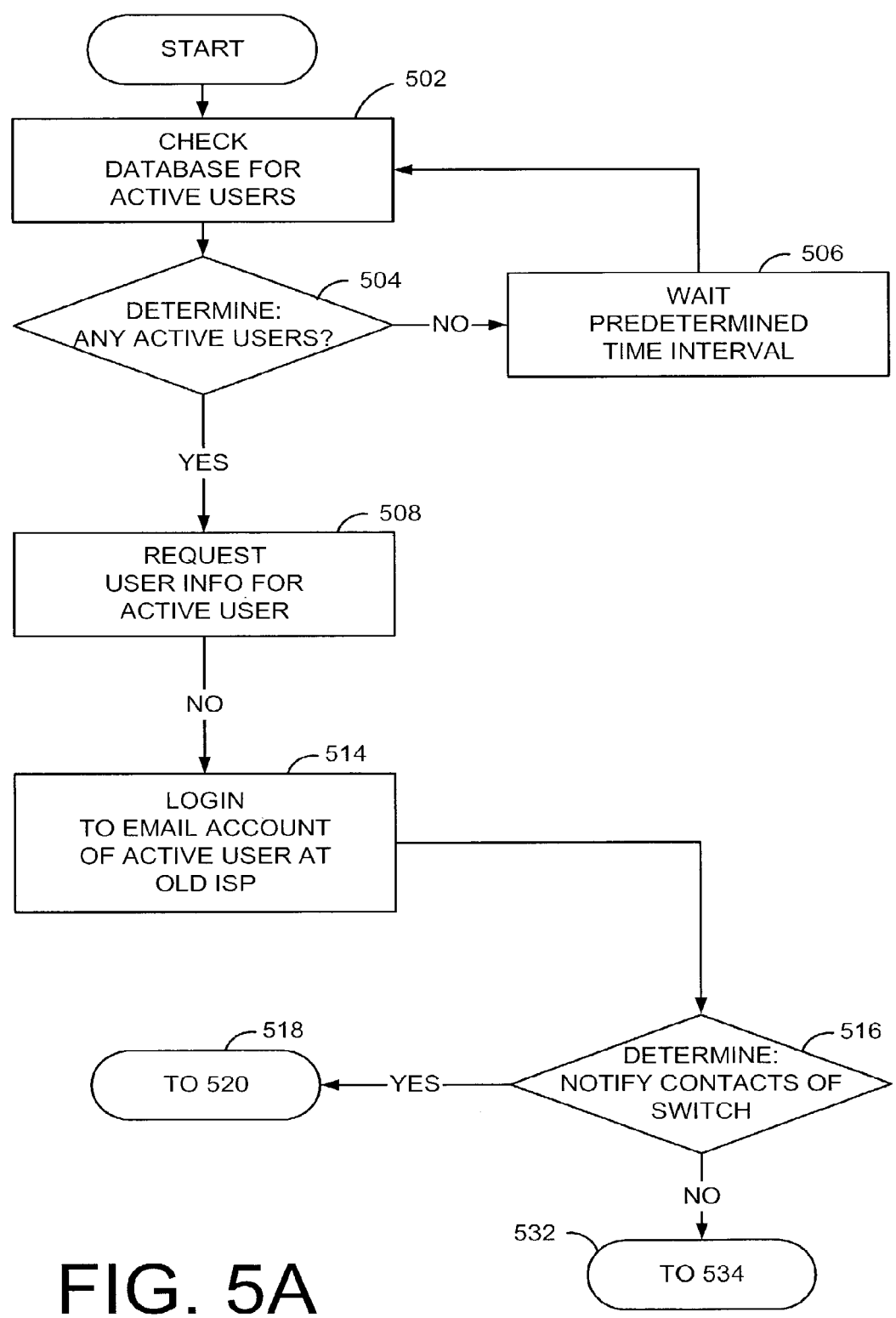
FIGS. 5A through 5C are flowcharts showing an embodiment of a method that assists an IM user to transition from an email environment of an old ISP to an email environment of a new ISP.
Figure 5B:
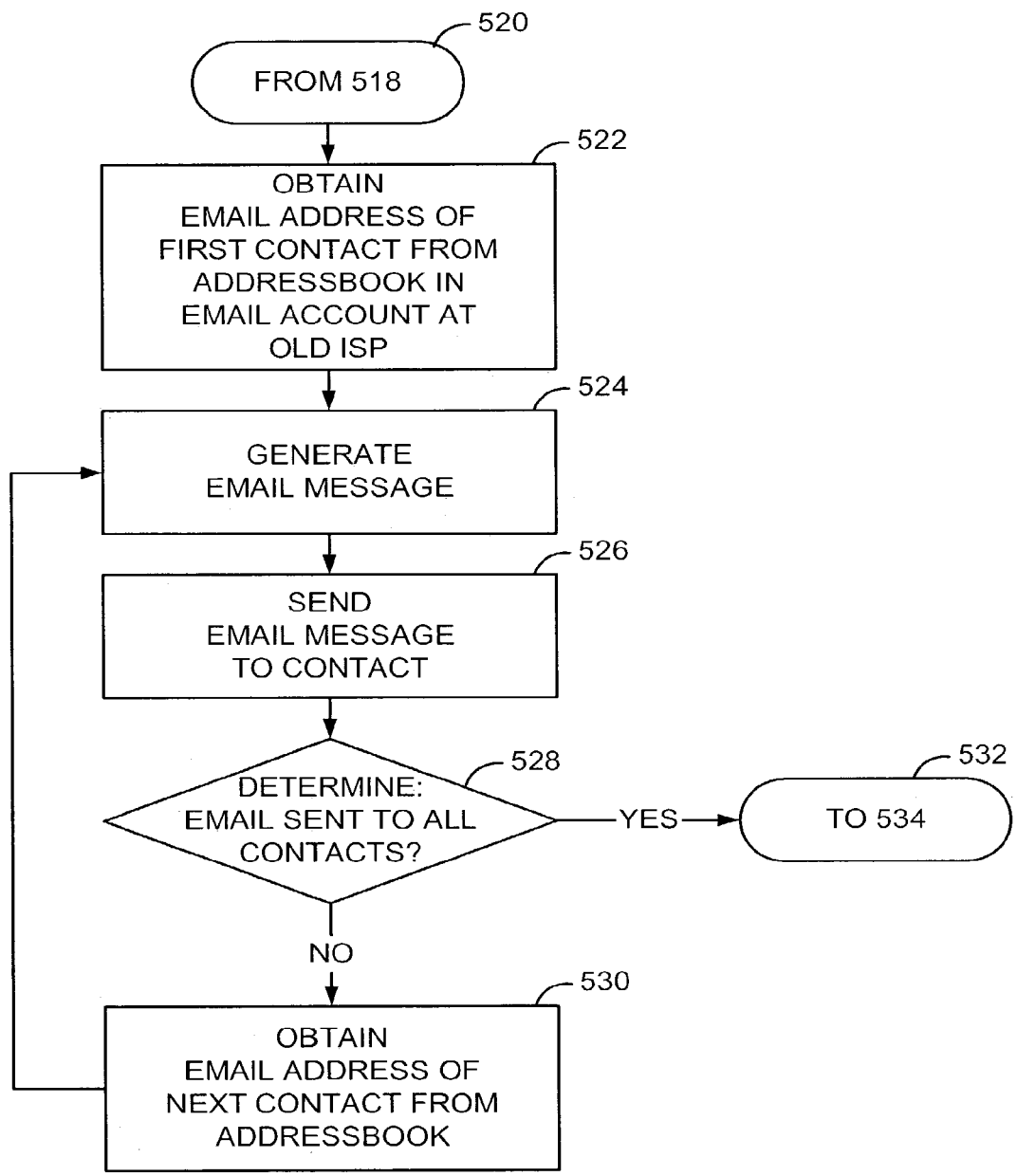
Figure 5C:
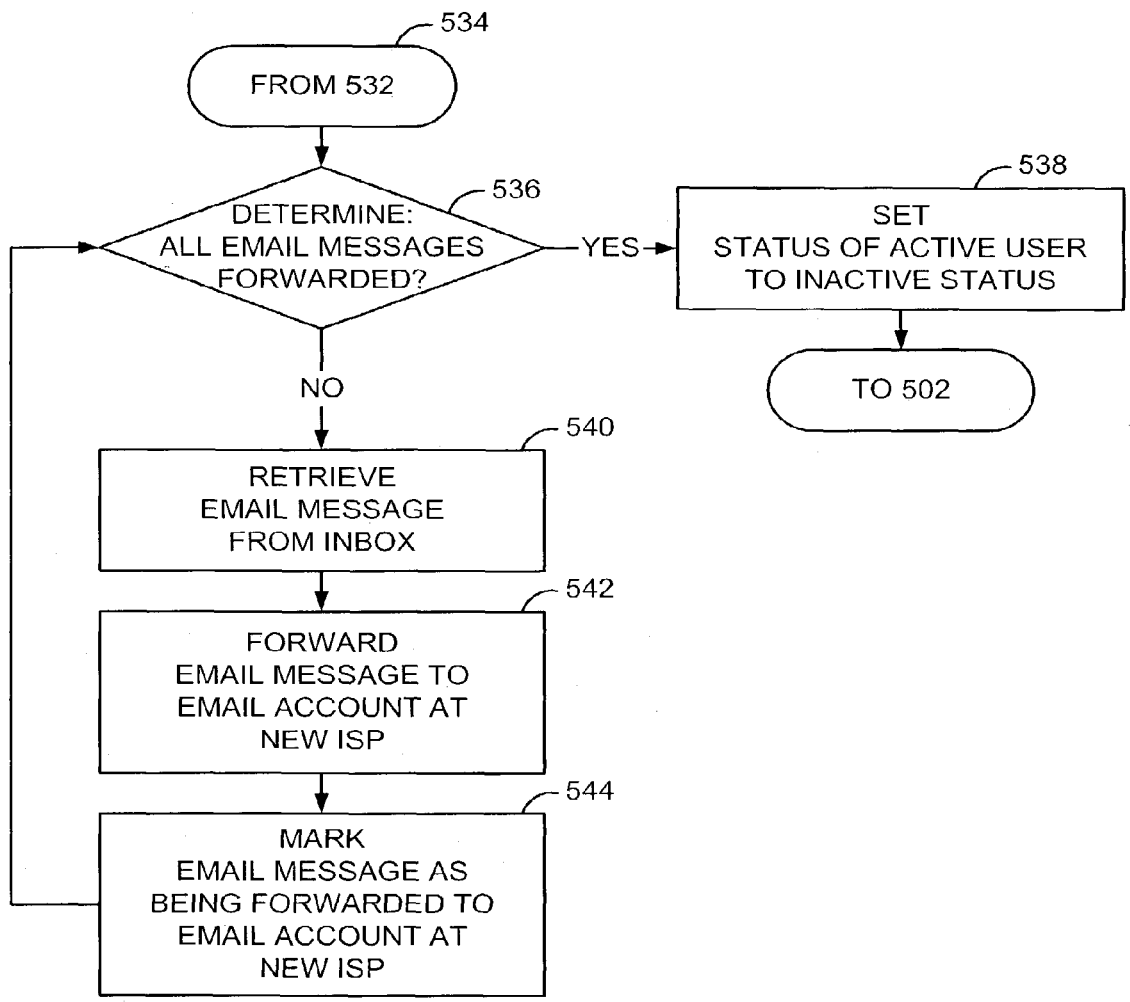

Having shown an embodiment of the database 154, attention is turned to FIGS. 5A through 5C, which are flowcharts showing an embodiment of a method for assisting an IM user to transition from an email environment of an old ISP to an email environment of a new ISP. In some embodiments, the processes of FIGS. 5A through 5C are performed by an application server 156 located at the new ISP 150. As shown in FIG. 5A, an embodiment of the process begins when the application server 156 checks (502) the database 154 for active users. In some embodiments, this is done by checking the status column, as shown in FIG. 4, to determine (504) whether or not any of the user statuses are active. If it is determined (504) that all of the user statuses are inactive, then the application server waits (506) a predetermined time interval and repeats the check (502) of the database for active users. In some embodiments, the predetermined time interval may be two minutes. However, this interval may be increased or decreased as desired. The status setting provides a relatively efficient approach to checking a user's email account, as compared to other approaches. For example, in a simple sequential approach (e.g., round robin), a system checks the email account of one user and, when completed, checks the email account of the next user, followed by the next user, etc. If the list of users contains numerous users (e.g., 10,000 users), then the email accounts of each user may only be checked sparsely (e.g., once a week). Conversely, if the list of users contains only a handful of users (e.g., two users), then each email account may be checked every few seconds, thereby unnecessarily occupying system resources. By employing a rule-based checking of email using the status flags, the email accounts of the users may be checked in a more ordered fashion.

Given the "active" and "inactive" statuses of each user, if it is determined (504) that any "active" user exists, then the application server 156 requests (508) the user information for the "active" user. The requested (508) user information may include an old ISP user name, an old ISP password, a new ISP user name, and/or any other information in the database that is correlated to the "active" user. Upon receiving the user information, the application server 156 logs in (514) to the old ISP email account. Upon logging in (514) to the old ISP email account, the application server 156 further determines (516) whether or not the "active" user's contact should be notified of the switch to the new ISP 150. The indication of whether or not to notify the contacts may also be stored as a flag (not shown) in the database 154. If the flag (not shown) indicates that the contacts should be notified, then the process continues to FIG. 5B. If, on the other hand, the flag (not shown) indicates that the contacts should not be notified, then the process continues to FIG. 5C.

As shown in FIG. 5B, when the application server 156 determines (516) that the user's contacts are to be notified of the switch from the old ISP 140 to the new ISP 150, the application server 156 obtains (522) the email address of a contact from the addressbook in the old ISP email account. Using this email address, a notification email message is generated (524), which indicates that the user has switched from the old ISP 140 to the new ISP 150. The notification email message is sent (526) to the contact. Thereafter, the application server 156 determines (528) whether or not a notification email message has been sent to all of the user's contacts in the addressbook. If a notification email has been sent (526) to all of the contacts in the user's addressbook, then the process continues to FIG. 5C. If, however, a notification email has not been sent to all of the contacts, then the application server 156 obtains (530) an email address of another contact from the addressbook, generates (524) a notification email message, and sends (526) the notification email message. The process of FIG. 5B is repeated until a notification email message has been sent to all of the user's contacts in the addressbook. Thereafter, the notification flag (not shown) is reset to indicate that all of the contacts have been notified of the switch, and the process continues to FIG. 5C.

As shown in FIG. 5C, the application server 156 determines (536) whether or not all email messages in the "active" user's old ISP email account has been forwarded to the user's new ISP email account. If all email messages have been forwarded to the new ISP email account, then the application server 156 sets (538) the status of the "active" user to "inactive," and the process repeats from FIG. 5A, where the application server 156 checks (502) the database for another "active" user. If, on the other hand, all email messages have not been forwarded to the new ISP email account, then the application server 156 retrieves (540) an email message, which has not been forwarded, from the inbox of the old ISP email account, and forwards (542) the email message to the new ISP email account. The forwarded email message is marked (544) as being forwarded to the new ISP email account, and the application server 156 again determines (536) whether or not all email messages have been forwarded from the old ISP email account to the new ISP email account. The process of FIG. 5C repeats itself until all email messages are forwarded from the old ISP email account to the new ISP email account. Thereafter, the application server 156 sets (538) the status of the "active" user to "inactive," and the process returns to FIG. 5A, where the application server 156 checks (502) the database for another "active" user.

Once the status of a user has been changed from "active" to "inactive," that status may be changed back to "active" as a function of various conditions such as, for example, a finite time delay. Additionally, the system may be configured to check for various error conditions that may be remedied. For example, if the status of the user has been "active" for over two hours, this may indicate that the user has been logged into the old ISP for over two hours, which is indicative of an error condition because the email forwarding process should normally be only a few minutes. This type of maintenance check may be performed by various software programs that are known in the art, or various software programs that may be configured for such tasks. Additionally, other maintenance programs may be implemented in order to accommodate other error conditions. For example, if the login attempt repeatedly fails, then an error log may be created to apprise the user of the failed attempts. Similarly, if the expiration period (as shown in FIG. 4) is near, then a notice may be sent to the user to apprise the user of the nearing expiration date. It should be appreciated that these and other conditions may be implemented as part of the maintenance protocol for such a system.

As shown in the embodiment of FIGS. 5A through 5C, the forwarding of the email by the application server 156 results in a consolidation of all email messages. In other words, by forwarding all email messages from the old ISP email account to the new ISP email account, the application server 156 directs email messages to a single account from which the user may access all of the user's email messages. Hence, the migration from an old ISP to a new ISP is made easier for the user.

Figure 6:
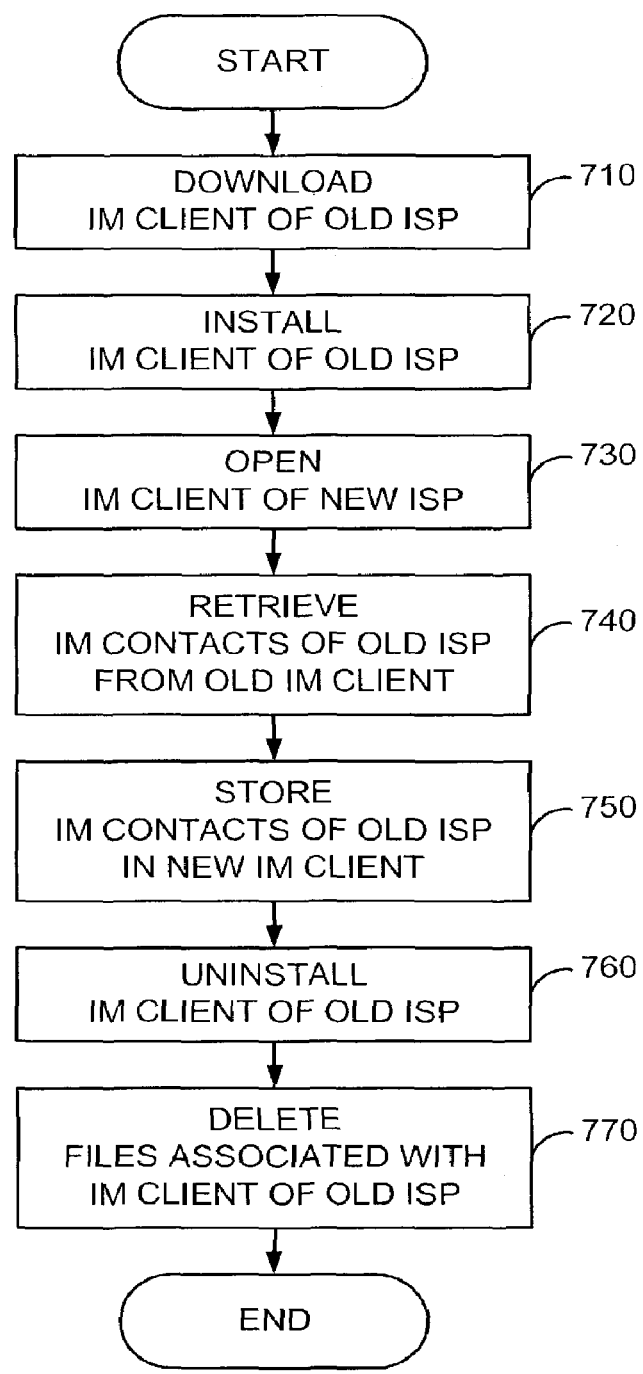
FIG. 6 is a flowchart showing an embodiment of a method that assists an IM user to transition from an IM environment of an old ISP to an IM environment of a new ISP.
Figure 7:
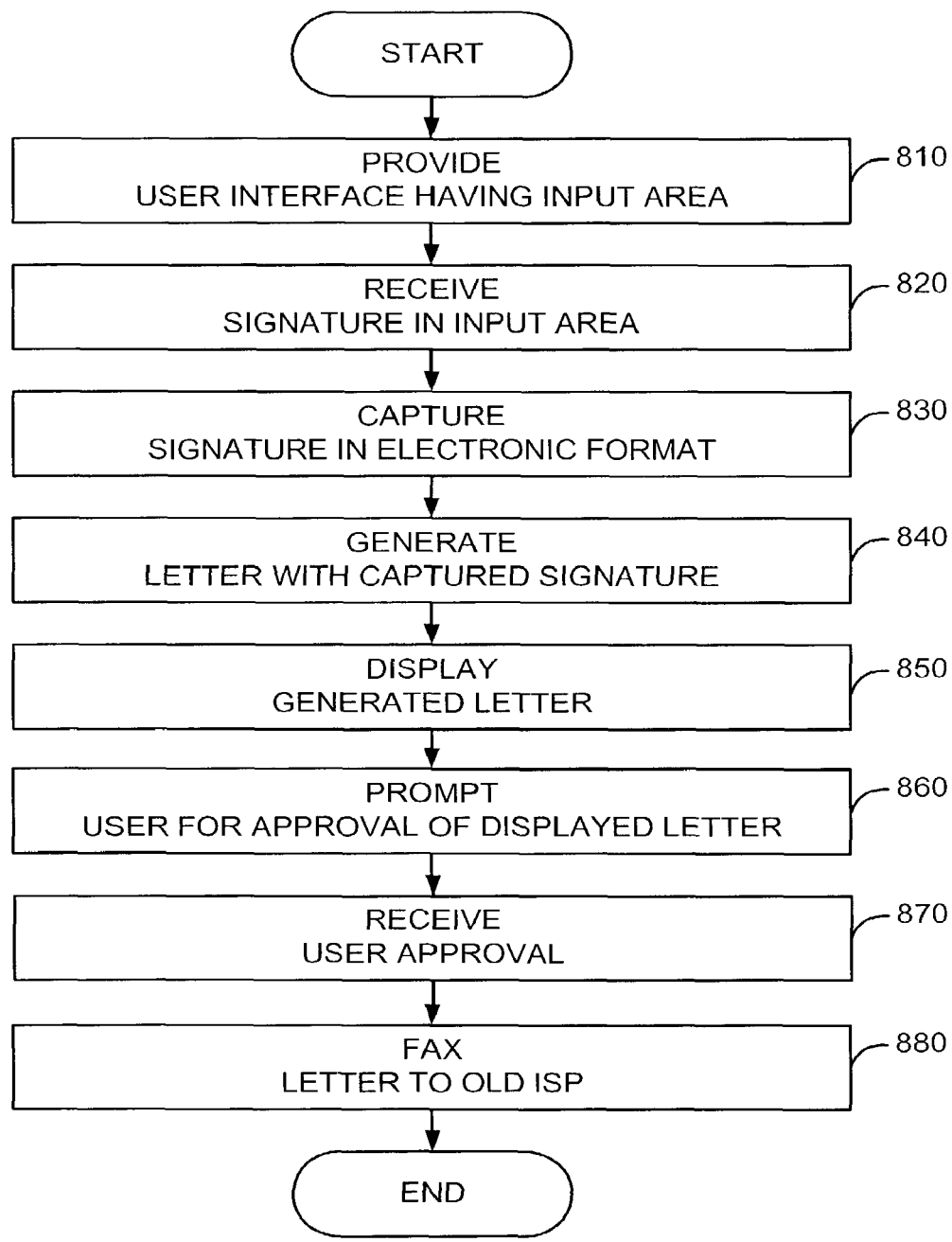
FIG. 7 is a flowchart showing an embodiment of a process for capturing an electronic signature and generating a prewritten letter.

While FIGS. 1 through 5 discuss embodiments that assist users in switching from an old ISP email system to a new ISP email system, FIGS. 6 and 7 discuss embodiments of an application that assist users in switching from an old ISP IM system to a new ISP IM system.

FIG. 6 is a flowchart showing an embodiment of a method that assists an IM user to transition from an IM environment of an old ISP 140 to an IM environment of a new ISP 150. Often contact lists for various users are stored at an ISP. Hence, upon opening or executing an IM client at a workstation; the user's contact list is often retrieved from the ISP through an IM transport and displayed to the user at the workstation. The flowchart of FIG. 6 provides a mechanism by which the user's contact list from an old ISP may be transferred to a user's new ISP so that the user need not re-create the contact list.

As shown in FIG. 6, in some embodiments, an IM client is downloaded (710) from an old ISP. The downloaded IM client is then installed (720), thereby providing a user's contact information from the old ISP. Upon downloading (710) and installing (720) the old ISP IM client, an IM client of a new ISP is opened (730). The IM contacts from the old ISP are then retrieved (740) from the old ISP IM client and, subsequently, stored (750) in the new ISP IM client, thereby transferring the contact list from the old ISP IM client to the new ISP IM client. Once the contact information has been transferred from the old ISP IM client to the new ISP IM client, the old ISP IM client is uninstalled (760), and all files associated with the old ISP IM client are deleted (770). As a specific example, if a new BellSouth® ISP user wishes to switch from AOL®'s ISP service to BellSouth®'s ISP service, that user may wish to transfer the user's AOL® IM contacts to the new BellSouth® platform so that the user need not re-create all of the AOL®'s contacts. In this instance, if the AOL® ISP service is cancelled prior to activating the BellSouth® ISP service, then all of the user's AOL® information will typically be unavailable for transfer from AOL® to BellSouth®). In order to prevent the loss of information, the switcher application may download and install the AOL® IM client prior to canceling the AOL® ISP service, thereby preserving the user's AOL® contact information. Once the AOL® IM client has been downloaded and installed, the user's AOL® contact information is now available for transfer to BellSouth®. In order to complete the transfer of contact information, the switcher application executes the BellSouth® IM client, which may be configured as an AOL® IM gateway, thus storing the AOL® IM contact information in the BellSouth®) IM client. Once the contact information is stored for access by the BellSouth® IM client, there is no longer any need for the AOL® IM client, since the functions of the AOL® IM client would merely be duplicative of the functions of the BellSouth® IM client. Hence, the switcher application may uninstall the AOL® IM client and delete all files associated with the AOL® IM client, thereby completing the migration from AOL® IM to BellSouth® IM.

FIG. 7 is a flowchart showing an embodiment of a process for capturing an electronic signature and generating a pre-written letter. As described above, one of the impediments to switching from an old ISP to a new ISP is the hassle of canceling the services of the old ISP. The embodiment of FIG. 7 shows a streamlined approach that facilitates the cancellation of services associated with the old ISP. In some embodiments, the process may begin by providing (810) a user interface having an input area for a graphical marking, such as a signature. The input area may be similar to that shown in FIG. 2F. Once the input area has been provided, when a user inputs a signature in the input area using an electronic input device (e.g., mouse, pointer, etc.), the system receives (820) the signature and captures (830) the signature in electronic format, which may include any known electronic format such as TIFF, GIF, JPG, etc. Using the captured signature, a letter is generated (840). For some embodiments, the letter requests cancellation of an old ISP service. Hence, for those embodiments, the letter includes user information necessary for cancellation of the old ISP service as well as the signature provided by the user. The generated letter is then displayed (850) to the user, and the user is prompted (860) for approval to fax the displayed letter to the old ISP. Upon receiving (870) approval from the user, the letter is faxed (880) to the old ISP on behalf of the user. The fax may be sent using conventional fax services that are available over the Internet. The fax may also be sent using dedicated fax hardware. Since methods of electronically faxing a letter are known in the art, further discussion of faxing methods is omitted here. In some embodiments, the letter may be rendered for display at one time, and then faxed to the old ISP at a later time. For those embodiments, the database of FIG. 4 may also contain information on a triggering event that prompts the sending of the fax from the new ISP to the old ISP. The triggering event, in some embodiments, may be the elapsing of a predefined time interval, such as, for example, 25 days from the date of switching. In other embodiments the triggering event may be defined by other criteria. As shown in FIG. 7, the automatic generation and transmission of a letter from the new ISP to the old ISP relieves the user of the burden of having to personally cancel the services of the old ISP, thereby streamlining the switching process. In other embodiments, the letter may be rendered for display at one time, and subsequently deleted upon approval by the user. Thus, upon the occurrence of the triggering event, the letter may be re-rendered for transmission. The deletion of the letter in the interim results in a saving of electronic storage space. In other words, by deleting the entire letter until the time of transmission, less system resources are occupied, thereby freeing up those resources for other uses. In other embodiments, the letter, once transmitted, is saved until a confirmation of the transmission is received. Thus, for example, if the letter is automatically faxed, then the letter is saved until a fax confirmation is received. Thereafter, the letter may be deleted to open up system resources.

As shown in the embodiments of FIGS. 6 and 7, and the specific example provided above, the process of migrating from one ISP IM environment to another ISP IM environment is facilitated by the transfer of contact information from one ISP to another ISP. Similarly, as shown in the embodiments of FIGS. 1 through 5, the forwarding of email messages from one ISP email account to another ISP email account provides a smoother transition in email accounts. These conveniences result in an easier migration from one ISP to another ISP.

The web browser, the IM client, the email client, and the switcher application of the present invention can be implemented in hardware, software, firmware, or a combination thereof. In the preferred embodiment(s), the web browser, the IM client, the email client, and the switcher application are implemented in software or firmware that is stored in a memory and that is executed by a suitable instruction execution system. If implemented in hardware, as in an alternative embodiment, the web browser, the IM client, the email client, and the switcher application can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. It should be appreciated that the logic, while not explicitly shown, may be a part of the processor as shown in FIG. 1. In this regard, the processor, when properly configured, may contain the logic components that perform each of the recited method steps. These logic components, while not explicitly shown, should be understood as being structural components within the processor.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The email client, the switcher application, the IM client, and other described programs, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. All such changes, modifications, and alterations should therefore be seen as within the scope of the present invention

What is claimed is:

1. A method for facilitating migration from an old Internet service provider to a new Internet service provider, the method comprising:

receiving, using a programmed processor, user information for an old Internet service provider account and a new Internet service provider account, the user information comprising an old Internet service provider user name, an old Internet service provider password, a new Internet service provider user name, and a new Internet service provider password;

receiving, using a programmed processor, data validating the old Internet service provider user name and the old Internet service provider password from the old Internet service provider;

receiving, using a programmed processor, data validating the new Internet service provider user name and the new Internet service provider password from the new Internet service provider;

accessing, using a programmed processor, the new Internet service provider account and old Internet service provider account using the user information to forward email from the old Internet service provider account to the new Internet service provider account;

receiving, using a programmed processor, approval from a user associated with the user information to wait for a designated period of time to elapse before terminating the old Internet service provider account; and in response to the approval, automatically conveying, using a programmed processor, a cancellation of service request to the old Internet service provider after the designated period of time elapsed.

2. A method as defined in claim 1, wherein communicating with the old Internet service provider to validate the old Internet service provider user name and password comprises attempting to login to an old Internet service provider email account using the old Internet service provider user name and the old Internet service provider password.

3. A method as defined in claim 1, wherein conveying the cancellation of service request to the old Internet service provider comprises sending a facsimile message including account information associated with the old account at the old Internet service provider.

4. A method as defined in claim 3, further comprising automatically creating the facsimile message by automatically populating one or more fields with the account information.

5. A method as defined in claim 1, further comprising receiving an image of a signature via an Internet portal and populating a field of the facsimile message with the image.

6. A method as defined in claim 1, further comprising receiving at least one of an email, a contact stored in an address book, an instant message, an instant messaging contact, the old Internet service provider user name, and the old Internet service provider password, and storing the at least one of the email, the contact, the instant message, the instant messaging contact, the old Internet service provider user name, and the old Internet service provider password in association with the new Internet service provider account.

7. A tangible machine accessible medium, wherein the medium is not a signal having instructions stored thereon that, when executed, cause a machine to:

receive user information for an old Internet service provider account and a new Internet service provider account, the user information comprising an old Internet service provider user name, an old Internet service provider password, a new Internet service provider user name, and a new Internet service provider password;

communicate with the old Internet service provider to validate the old Internet service provider user name and the old Internet service provider password;

communicate with the new Internet service provider to validate the new Internet service provider user name and the new Internet service provider password;

access the new Internet service provider account and the old Internet service provider account using the user information to forward email from the old Internet service provider account to the new Internet service provider account;

request a user associated with the user information for approval to allow a designated period time to elapse from a date of switching to new Internet service provider before the old Internet service provider account is to be terminated; and in response to receiving the approval, automatically convey a cancellation of service request to the old Internet service provider after the designated period of time from the date of switching has elapsed.

8. A tangible machine accessible medium, wherein the medium is not a signal as defined in claim 7 having instructions stored thereon that, when executed, cause the machine to communicate with the old Internet service provider to validate the user information by attempting to login to an old Internet service provider email account using the old Internet service provider user name and the old Internet service provider password.

9. A tangible machine accessible medium, wherein the medium is not a signal as defined in claim 7 having instructions stored thereon that, when executed, cause the machine to convey the cancellation of service request to the old Internet service provider by sending a facsimile message including account information associated with an account at the old Internet service provider.

10. A tangible machine accessible medium, wherein the medium is not a signal as defined in claim 9 having instructions stored thereon that, when executed, cause the machine to automatically create the facsimile message by automatically populating one or more fields with the account information.

11. A tangible machine accessible medium, wherein the medium is not a signal as defined in claim 7 having instructions stored thereon that, when executed, cause the machine to receive an image of a signature via an Internet portal and to populate a field of the facsimile message with the image.

12. A tangible machine accessible medium, wherein the medium is not a signal as defined in claim 7 having instructions stored thereon that, when executed, cause the machine to receive at least one of an email, a contact stored in an address book, an instant message, an instant messaging contact, the old ISP user name, and the old ISP password, and to store the at least one of the email, the contact, the instant message, the instant messaging contact, the old ISP user name, and the old ISP password in association with the new ISP account.

13. A switcher application for facilitating migration from an old Internet service provider to a new Internet service provider, the switcher application comprising:

a web server to receive user information for an old Internet service provider account and a new Internet service provider account, the user information comprising an old Internet service provider user name, an old Internet service provider password, a new Internet service provider user name, and a new Internet service provider password, the web server to communicate with the old Internet service provider to validate the old Internet service provider user name and the old Internet service provider password at the old Internet service provider, the web server to request approval from a user associated with the user information to schedule a cancellation request to be conveyed to the old Internet service provider after a designated period of time has elapsed;

a database to store the new Internet service provider user name and the new Internet service provider password at the new Internet service provider; and an application server to access the old Internet service provider using the user information to forward email from the old Internet service provider to the new Internet service provider, the application server to automatically convey the cancellation request to the old Internet service provider after the designated period of time has elapsed in response to receiving the approval from the user.

14. A switcher application as defined in claim 13, wherein the web server is to validate the user information by attempting to login to an old Internet service provider email account using the old Internet service provider user name and the old Internet service provider password.

15. A switcher application as defined in claim 13, wherein the application server is to convey the cancellation of service request to the old Internet service provider by sending a facsimile message including account information associated with the old account at the old Internet service provider.

16. A switcher application as defined in claim 15, wherein the application server is to automatically create the facsimile message by automatically populating one or more fields with the account information.

17. A switcher application as defined in claim 13, further comprising a webpage implemented by the web server, the webpage to receive an image of a signature via an Internet portal, and the web server to populate a field of the facsimile message with the image.

\* \* \* \* \*